United States Patent
Magruder et al.

(10) Patent No.: US 7,890,707 B2
(45) Date of Patent: Feb. 15, 2011

(54) EFFICIENT RETRY FOR TRANSACTIONAL MEMORY

(75) Inventors: Michael M. Magruder, Carnation, WA (US); David Detlefs, Issaquah, WA (US); John Joseph Duffy, Seattle, WA (US); Goetz Graefe, Madison, WI (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 11/823,211

(22) Filed: Jun. 27, 2007

(65) Prior Publication Data

US 2009/0007070 A1    Jan. 1, 2009

(51) Int. Cl.
    *G06F 12/00*    (2006.01)
(52) U.S. Cl. .............................. 711/150; 711/E12.044
(58) Field of Classification Search ........................ None
    See application file for complete search history.

(56) References Cited

U.S. PATENT DOCUMENTS

| | | | |
|---|---|---|---|
| 5,241,675 A | 8/1993 | Sheth et al. | |
| 5,335,343 A | 8/1994 | Lampson et al. | |
| 5,701,480 A | 12/1997 | Raz | |
| 6,754,737 B2 | 6/2004 | Heynemann et al. | |
| 6,785,779 B2 | 8/2004 | Berg et al. | |
| 7,089,253 B2 | 8/2006 | Hinshaw et al. | |
| 7,428,539 B2 * | 9/2008 | Clift et al. ........................... | 1/1 |
| 2003/0115276 A1 | 6/2003 | Flaherty et al. | |
| 2004/0015642 A1 | 1/2004 | Moir et al. | |
| 2006/0112248 A1 | 5/2006 | Meiri et al. | |
| 2006/0190504 A1 | 8/2006 | Pruet, III | |
| 2006/0218206 A1 | 9/2006 | Bourbonnais et al. | |
| 2007/0136725 A1 * | 6/2007 | Accapadi et al. ............ | 718/100 |
| 2007/0198792 A1 * | 8/2007 | Dice et al. .................. | 711/163 |

OTHER PUBLICATIONS

Costich, Oliver, "Transaction Processing Using an Untrusted Scheduler in a Multilevel Database with Replicated Architectures," IFIP Transactions; Results of the IFIP WG 11.3 Workshop on Database Security V: Status and Prospects, vol. A-6, pp. 173-189, Nov. 1991.
Dekeyser, Stijn, et al., "Conflict Scheduling of Transactions on XML Documents," ACM International Conference Proceedings Series, vol. 52, Proceedings of the 15th Australasian Database Conference, vol. 27, pp. 93-101, Jan. 2004.
Yeo, L. H., et al., "Linear Oderability of Transactions in Mobile Environment with Heterogeneous Databases," http://journalogy.com, pp. 1 Abstract, Jun. 1996.

* cited by examiner

*Primary Examiner*—Reginald G Bragdon
*Assistant Examiner*—Aracelis Ruiz

(57) ABSTRACT

Various technologies and techniques are disclosed for implementing retrying transactions in a transactional memory system. The system allows a transaction to execute a retry operation. The system registers for waits on every read in a read set of the retrying transaction. The retrying transaction waits for notification that something in the read set has changed. A transaction knows if notification is required in one of two ways. If the transactional memory word contained a waiters bit during write lock acquisition, then during release the transactional memory word is looked up in an object waiters map, and waiting transactions are signaled. If a writing transaction finds a global count of waiting transactions to be greater than zero after releasing write locks, a transaction waiters map is used to determine which waiting transactions need to be signaled. In each case, the write lock is released using a normal store operation.

18 Claims, 9 Drawing Sheets

EFFICIENT RETRY FOR TRANSACTIONAL MEMORY

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. A data value in the context of transactional memory is the particular segment of shared memory being accessed, such as a single object, a cache line (such as in C++), a virtual memory page, a single word, etc.

Software transactional memory is designed to ease development of concurrent programs by providing atomicity and isolation to regions of program code. Some STM systems extend this capability with an operation called "retry" that allows basic communication between transactions. When a transaction executes a retry operation, its effects are rolled back and execution is suspended until something that the transaction read changes. When a change is detected, the transaction is re-executed. Retry operations can be used for some very common data structures, like blocking queues. For example, a transaction could check to see if a queue is empty and then retry if it is empty, or remove an element if the queue is not empty. The transaction will block while the queue remains unchanged and re-execute when the state of the queue changes, which gives the transaction another opportunity to complete. The problem with implementations of this retry operation in current STM systems is that they impose a lot of overhead on the operation of all transactions in the system, even if no transactions are executing a retry operation. Some systems, for example, perform a compare and swap (CAS) on every write lock release, and these CAS operations are expensive. Other systems require that an entire nest of transactions are rolled back if a small, deeply-nested transaction executes a retry operation, which can be very inefficient.

SUMMARY

Various technologies and techniques are disclosed for implementing retry in a transactional memory system. When a transaction executes a retry operation, the system registers for waits on every read in the read set of the retrying transaction. The retrying transaction waits for notification that something in the read set has changed. A wait notification is initiated from a particular transaction releasing a write lock. A transaction knows if notification is required in one of two ways. In the first way, if the transactional memory word containing transaction locking information for an object contained a waiters bit during write lock acquisition, then during release the transactional memory word is looked up in an object waiters map, and each waiting transaction is signaled. In the second way, if a writing transaction finds a global count of waiting transactions to be greater than zero after releasing all write locks, it will use a transaction waiters map to determine which transactions, if any, were waiting on locations written to and need to be signaled. In each case, the write lock is released using a normal store operation.

In one implementation, a progressive retry operation is started with a rollback of just the retrying nested transaction and waiting on its read set. After waiting for some particular time or for some other condition to be met, a backoff process is performed to rollback an immediate parent of the retrying transaction, increasing the size of the original wait set. The backoff process is repeated until rollback of a top-most parent, adding an additional wait for each next parent. The aggregate wait set is associated with the top-most parent and any notification will result in re-execution of the top-most parent.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a transactional memory system, but the technologies and techniques also serve other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a retry operation is provided that allows wait registration and notifications to be performed efficiently without the need for a compare-and-swap on every write lock release. The system uses a normal store operation on a transactional memory word (TMW) to release the write lock. The term "transactional memory word" as used herein is meant to include one or more data structures that represent the status of transactional locks in the system. Other variations of structures can be used in other implementations, but for purposes of example, a TMW is used for each lockable region of memory (object, cache line, etc.) A TMW is initially a version number (if the system supports optimistic reads), or a count of pessimistic readers (if the system supports pessimistic reads), or both if the system supports both. When a write lock is acquired on a TMW, its value switches to represent a write lock. When a write lock is released (either through transaction commit or rollback), the TMW value switches back to a version number/count of pessimistic readers with the version number incremented as appropriate. As noted previously, other structures and/or methods for tracking transaction locks could also be used by the transactional memory system than the TMW described herein.

In another implementation, a backoff process is used that allows a retry operation to be started using just the read set of a nested transaction, while later progressively expanding the set up the ancestor chain of transactions until the top-most transaction is reached.

Figure 1:
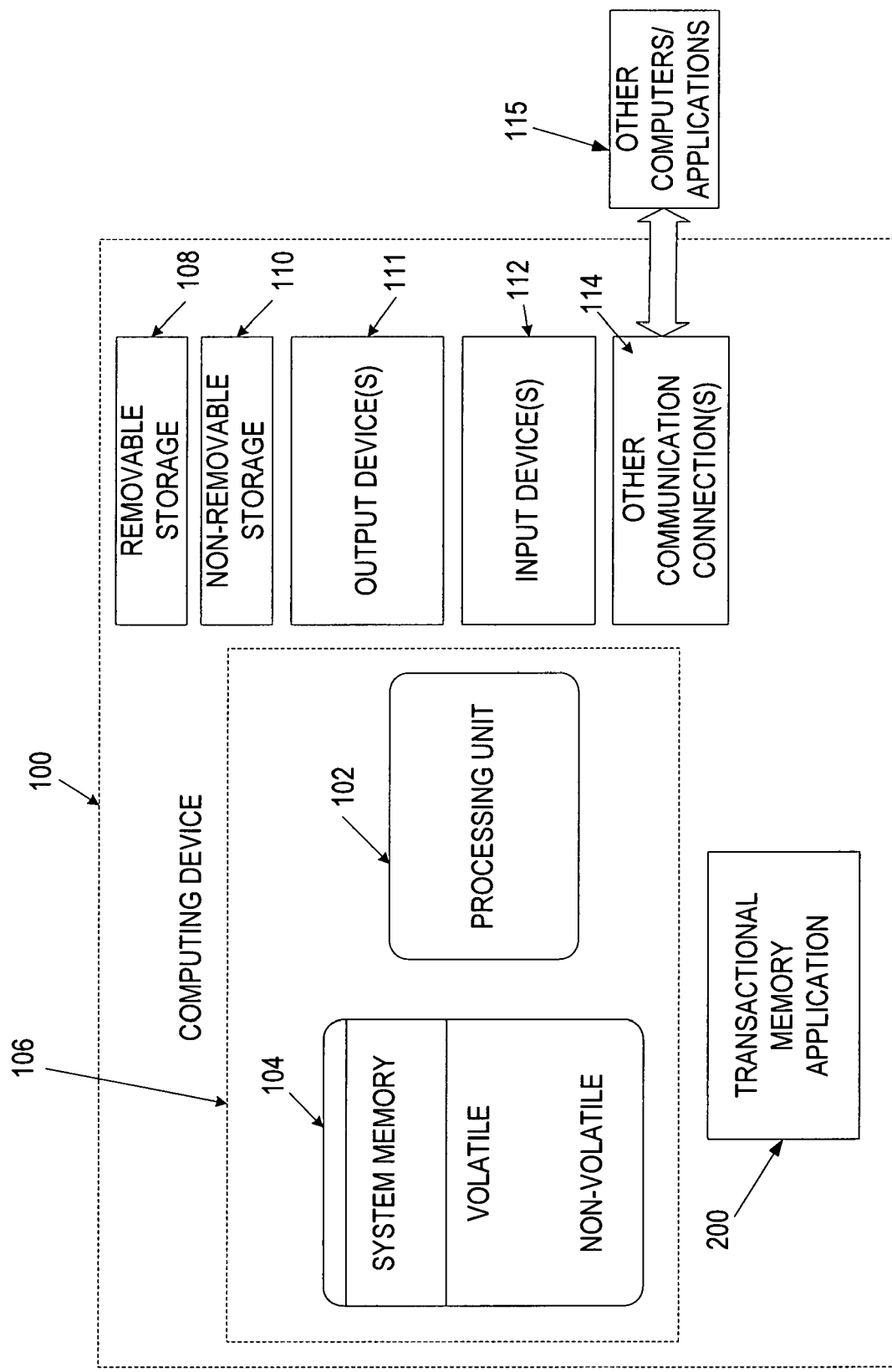
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
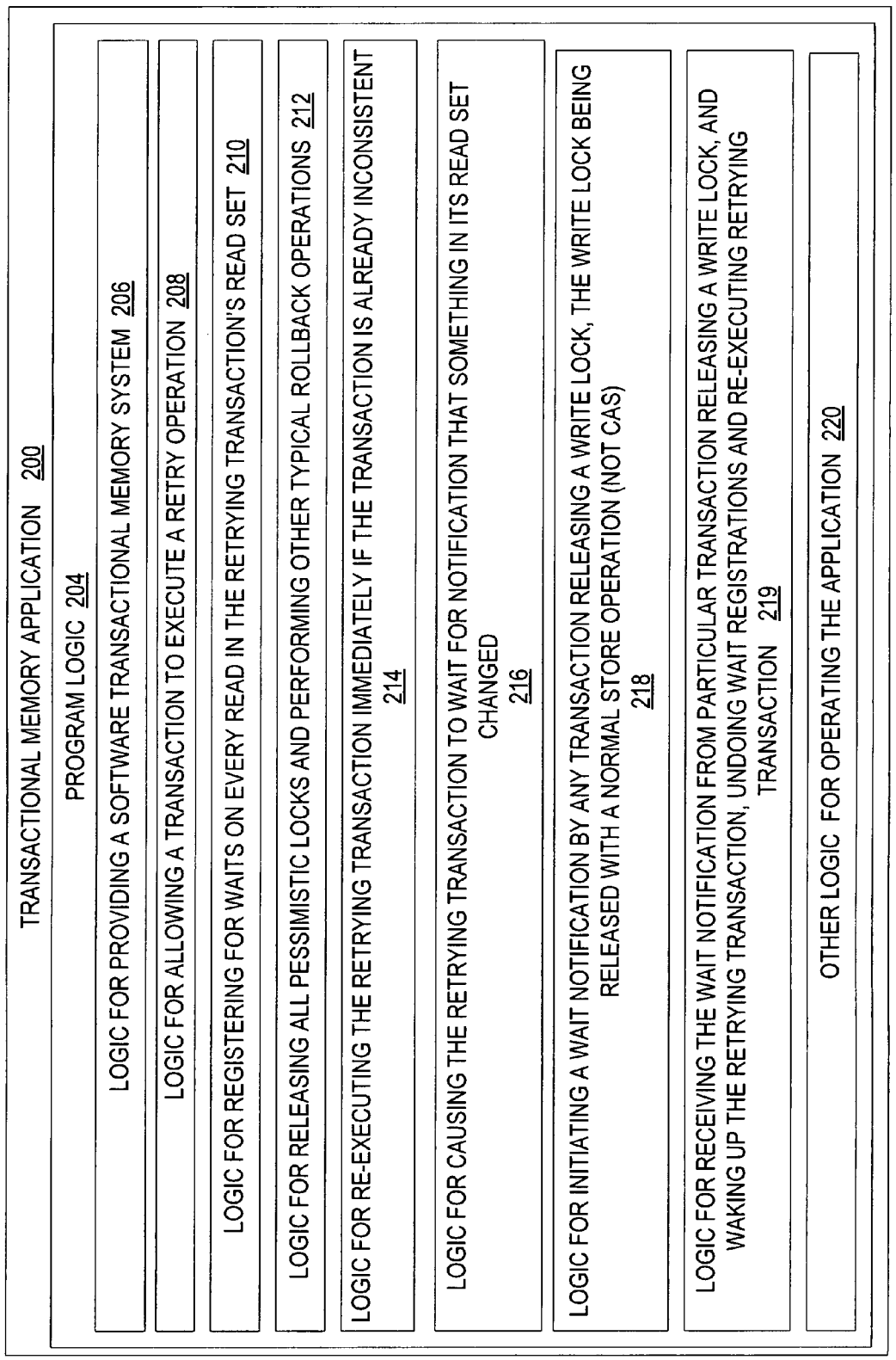
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a transactional memory system 206; logic for allowing a transaction to execute a retry operation 208 (e.g. as described below with respect to FIG. 3); logic for registering for waits on every read in the retrying transaction's read set 210 (e.g. as described below with respect to FIG. 3 and in more detail in FIG. 4); logic for releasing all pessimistic locks and performing other typical rollback operations 212 (e.g. as described below with respect to FIG. 3); logic for re-executing the retrying transaction immediately if the transaction is already inconsistent 214 (e.g. as described below with respect to FIG. 3); logic for causing the retrying transaction to wait for notification that something in its read set changed 216 (e.g. as described below with respect to FIG. 3); logic for initiating a wait notification from any transaction releasing a write lock, the write lock being released with a normal store operation (not compare-and-swap) 218 (e.g. as described below with respect to FIG. 6); logic for receiving the wait notification from a particular transaction releasing a write lock, and then waking up the retrying transaction, undoing all wait registrations and re-executing the retrying transaction 219 (e.g. as described below with respect to FIG. 5); and other logic for operating the application 220. In one implementation, program logic 204 is operable to be called programmatically from another program, such as using a single call to a procedure in program logic 204.

Figure 3:
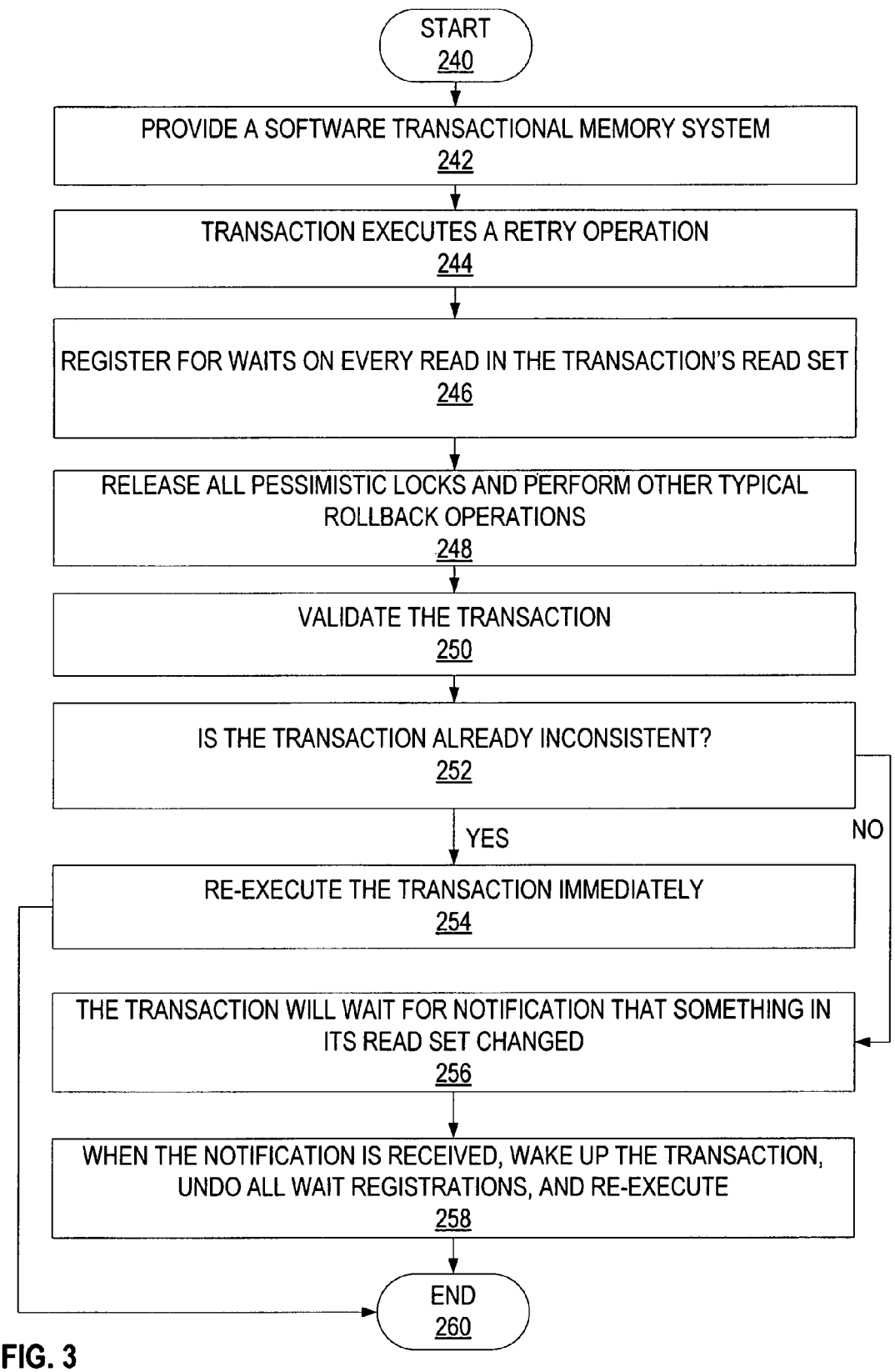
FIG. 3 is a high-level process flow diagram for one implementation of the system of FIG. 1.

Turning now to FIGS. 3-8 with continued reference to FIGS. 1-2, the stages for implementing one or more implementations of transactional memory application 200 are described in further detail. In some implementations, the processes of FIGS. 3-8 are at least partially implemented in the operating logic of computing device 100. FIG. 3 is a high level process flow diagram for transactional memory application 200. The process begins at start point 240 with providing a transactional memory system (stage 242). A transaction executes a retry operation (stage 244) and then registers for waits on every read in the transaction's read set (e.g. on every transactional memory word [TMW]) (stage 246). All pessimistic locks are released along with other typical rollback operations (stage 248).

At an appropriate point, the system validates the transaction (stage 250). In one implementation, validation could be performed during stage 246. In other implementations, the system validates the transaction at other times. If the transaction is already determined to be inconsistent (due to another transaction invalidating an optimistic read) (decision point 252), then the transaction is re-executed immediately (stage 254). Otherwise, the transaction will then wait for notification that something in its read set changed (stage 256). When the notification is received, the system wakes up the retrying transaction, undoes all wait registrations, and re-executes the retrying transaction (stage 258). The process ends at end point 260.

Figure 4A:
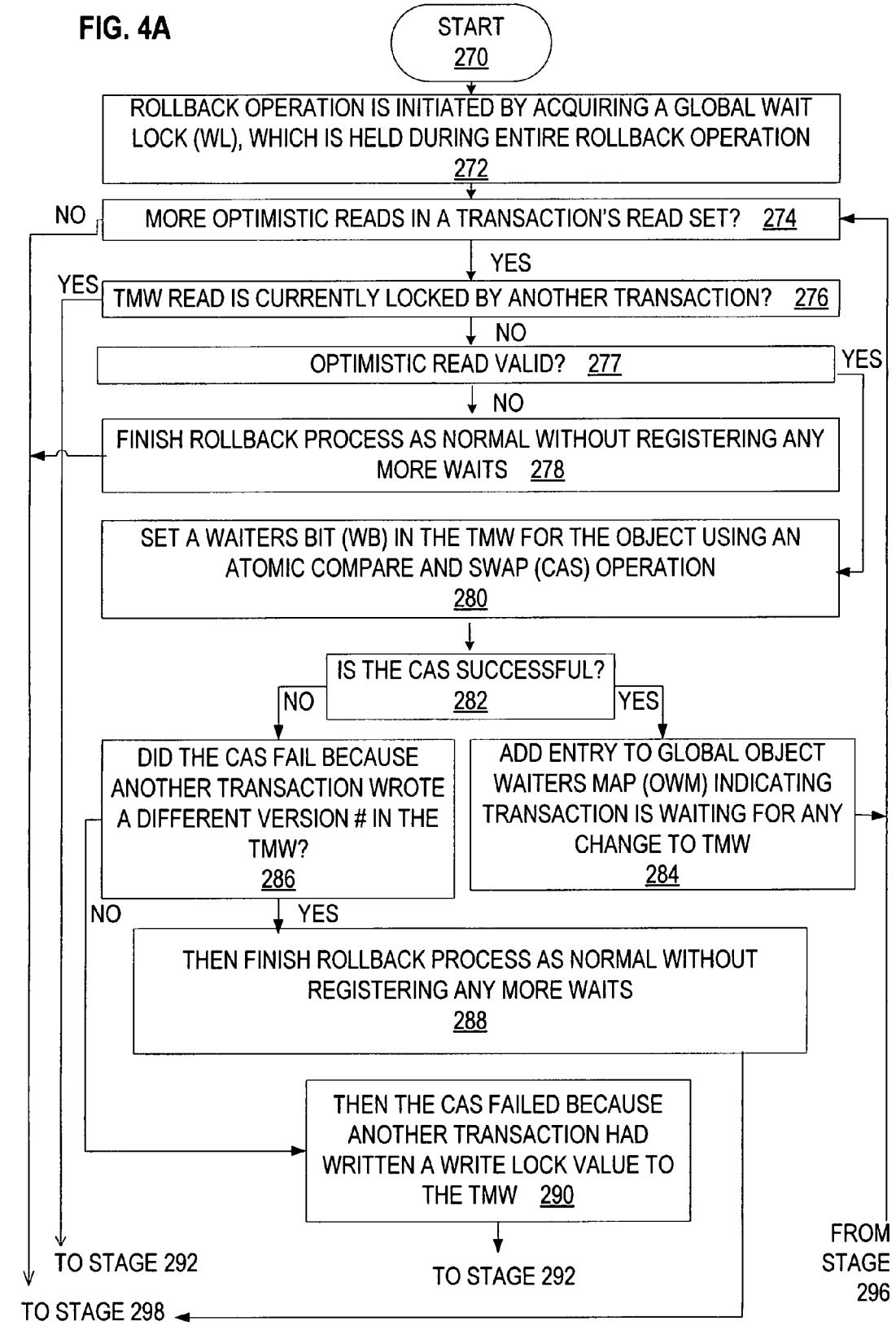
FIGS. 4A-4B are process flow diagrams for one implementation of the system of FIG. 1 illustrating the stages involved in registering for waits that are used to cause a transaction to re-execute.
Figure 4B:
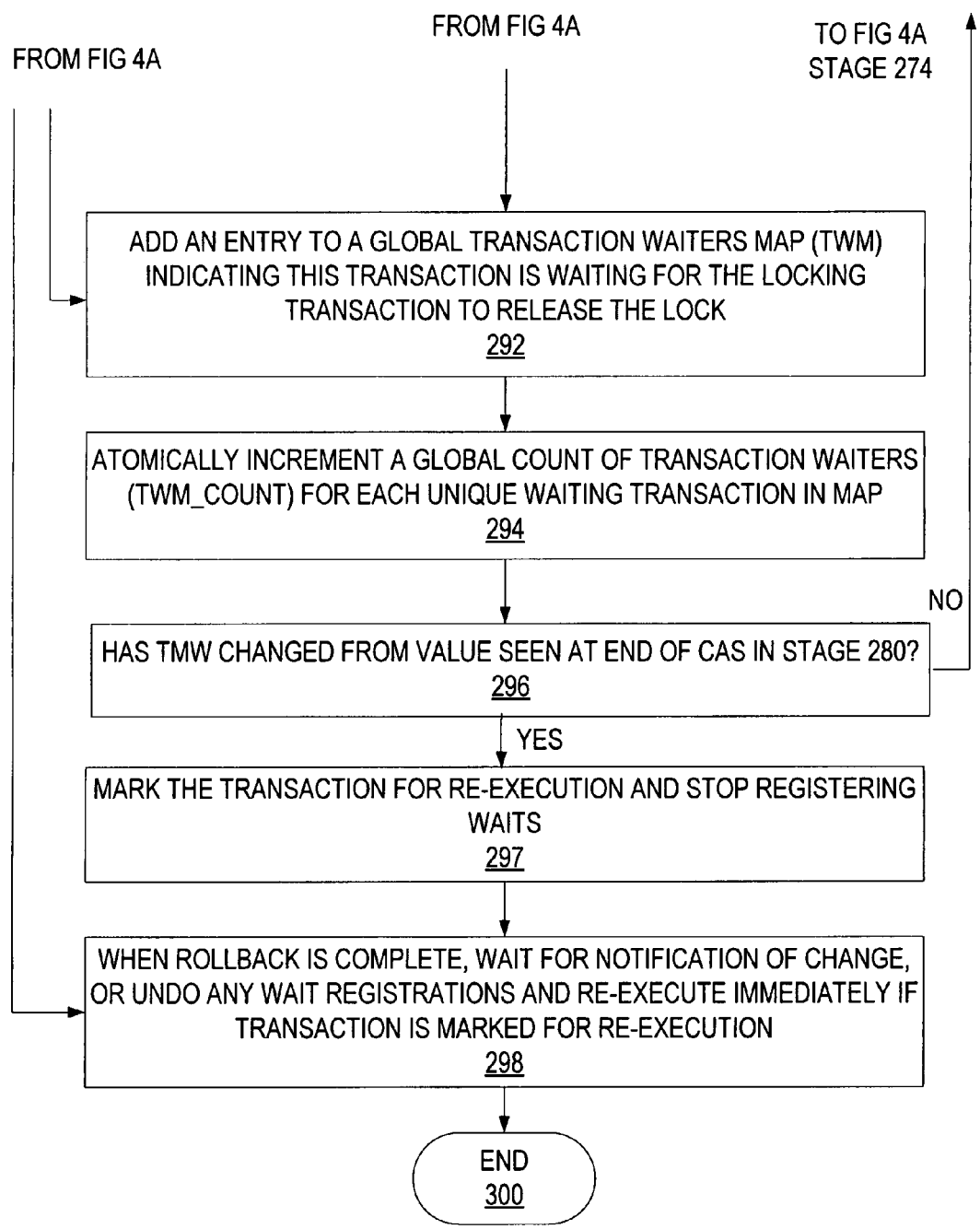

FIGS. 4A-4B illustrates one implementation of the stages involved in registering for waits that are used to cause a transaction to re-execute. The process begins at start point 270 with a rollback operation being initiated by acquiring a global wait lock (WL), which is held during the entire rollback operation (stage 272). For each optimistic read in a transaction's read set (decision point 274), various steps are performed.

For each optimistic read encountered in the read log, the current value of the TMW is read. If the TMW read is currently locked by another transaction (decision point 276), then the process continues at stage 292 as described later herein. If the TMW read is not currently locked by another transaction (decision point 276), and an optimistic read is determined to be invalid (decision point 277), then the system finishes the rollback process as normal without registering any more waits (stage 278), and the process continues at stage 298. If the optimistic read is determined to be valid (decision point 277), a waiters bit (WB) is set in the TMW for the object using an atomic compare and swap (CAS) operation or some other type of atomic series of one or more writes (stage 280). The term "waiters bit" as used herein is meant to include a flag or other indicator that is used to indicate that another transaction has registered a wait for a change to the particular object or memory protected by the TMW. If the CAS was successful (decision point 282), then the system adds an entry to a global object waiters map (OWM) indicating the transaction is waiting for any change to the TMW (stage 284) and processing continues at stage 274. The term "object waiters map" as used herein is meant to include a data structure that stores information about one or more transactions that are waiting for changes to one or more objects or memory regions.

If the CAS was not successful (decision point 282), and the CAS failed because another transaction had written a different version number to the TMW (decision point 286), then the system finishes the rollback process as normal without registering any more waits (stage 288) and processing continues at stage 298. If the CAS failure was not due to a different version number in the TMW, then the CAS failed because another transaction had written a write-lock value to the TMW (stage 290). In such case, as shown in FIG. 4B, the system adds an entry to a global transaction waiters map (TWM) indicating this transaction is waiting for the locking transaction to release the lock (stage 292). The term "transaction waiters map" as used herein is meant to include a data structure that stores information about one or more transactions that are waiting for one or more other transactions to release write locks. A global count of transaction waiters (TWM_COUNT) is also atomically incremented for each unique waiting transaction in the map (stage 294). If the TMW has changed from the value seen as the result of the CAS in stage 280 (decision point 296), the system marks the transaction for re-execution and stops registering waits and finishes rollback normally (stage 297. If the TMW has not changed from the value seen as the result of the CAS in stage 280 (decision point 296), then the process starts over again at stage 274 for the next read in the transaction's read set, if any.

The stages from 276 to 296 are re-evaluated and executed as necessary for each remaining read in the transaction's read set that is encountered during rollback (decision point 274). When rollback is complete, the system waits for notification of a change, or undoes any wait registrations and re-executes the retrying transaction immediately if the transaction is marked for re-execution (stage 298). The process ends at end point 300.

Figure 5:
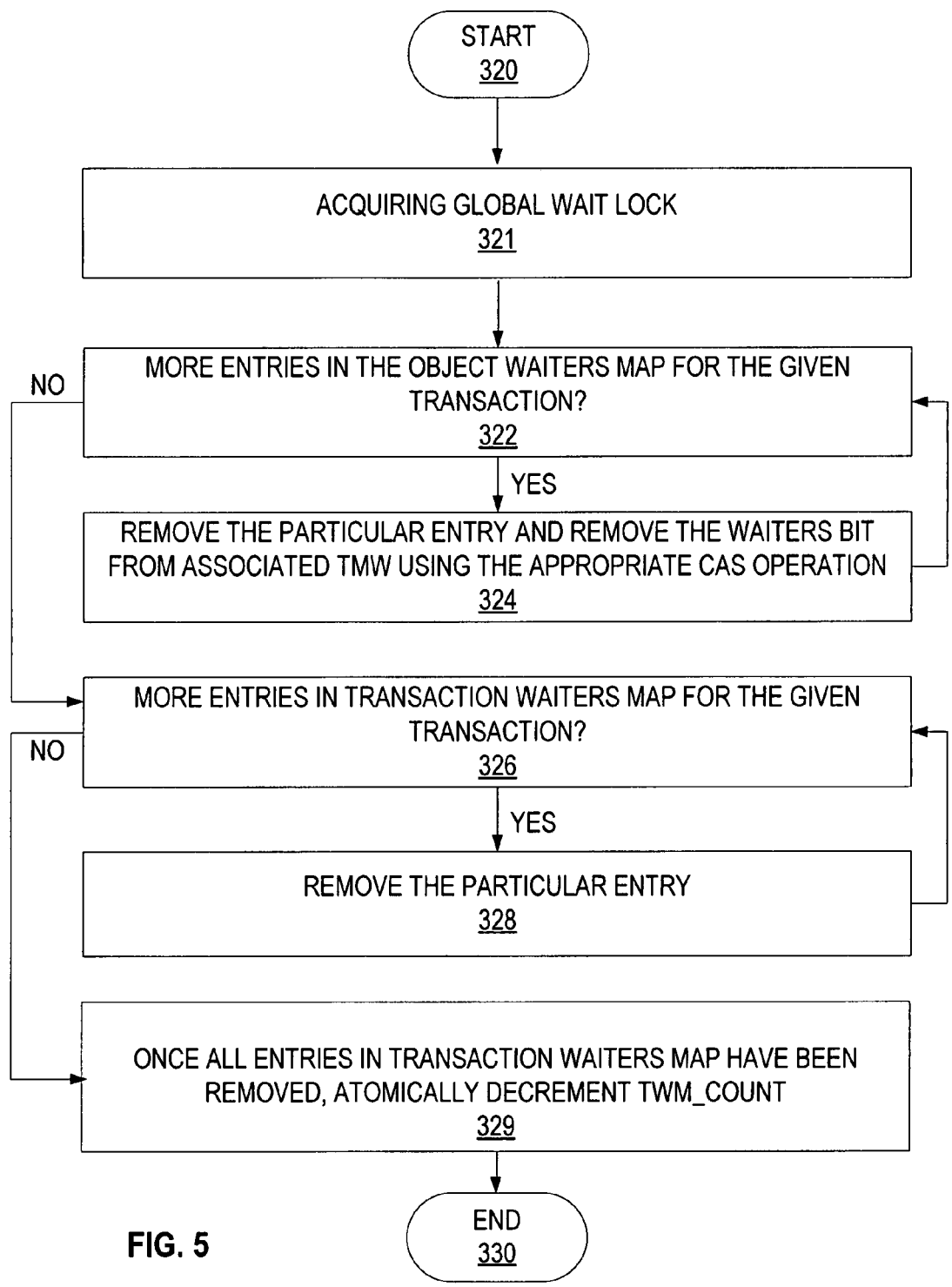
FIG. 5 is a process flow diagram for one implementation of the system of FIG. 1 illustrating the stages involved in undoing a wait registration.

FIG. 5 illustrates one implementation of the stages involved in undoing a wait registration. The process begins at start point 320 with acquiring the global wait lock, which is held during the entire wait undo operation (stage 321.) The process continues with determining whether there are there more entries in the object waiters map for the given transaction (decision point 322). If so, the system removes the particular entry and removes the waiters bit from the associated TMW using the appropriate CAS operation (stage 324). The removal operation of stage 324 is repeated for each entry in the object waiters map for the given transaction. The system also determines if there are more entries in the transaction waiters map for the given transaction (decision point 326). The particular entry is removed (stage 328). The removal operation of stage 328 is repeated for each entry in the transaction waiters map for the given transaction. Once all entries in the transaction waiters map for the given transaction have been removed, then the TWM_COUNT is atomically decremented (stage 329). The process ends at end point 330.

Figure 6:
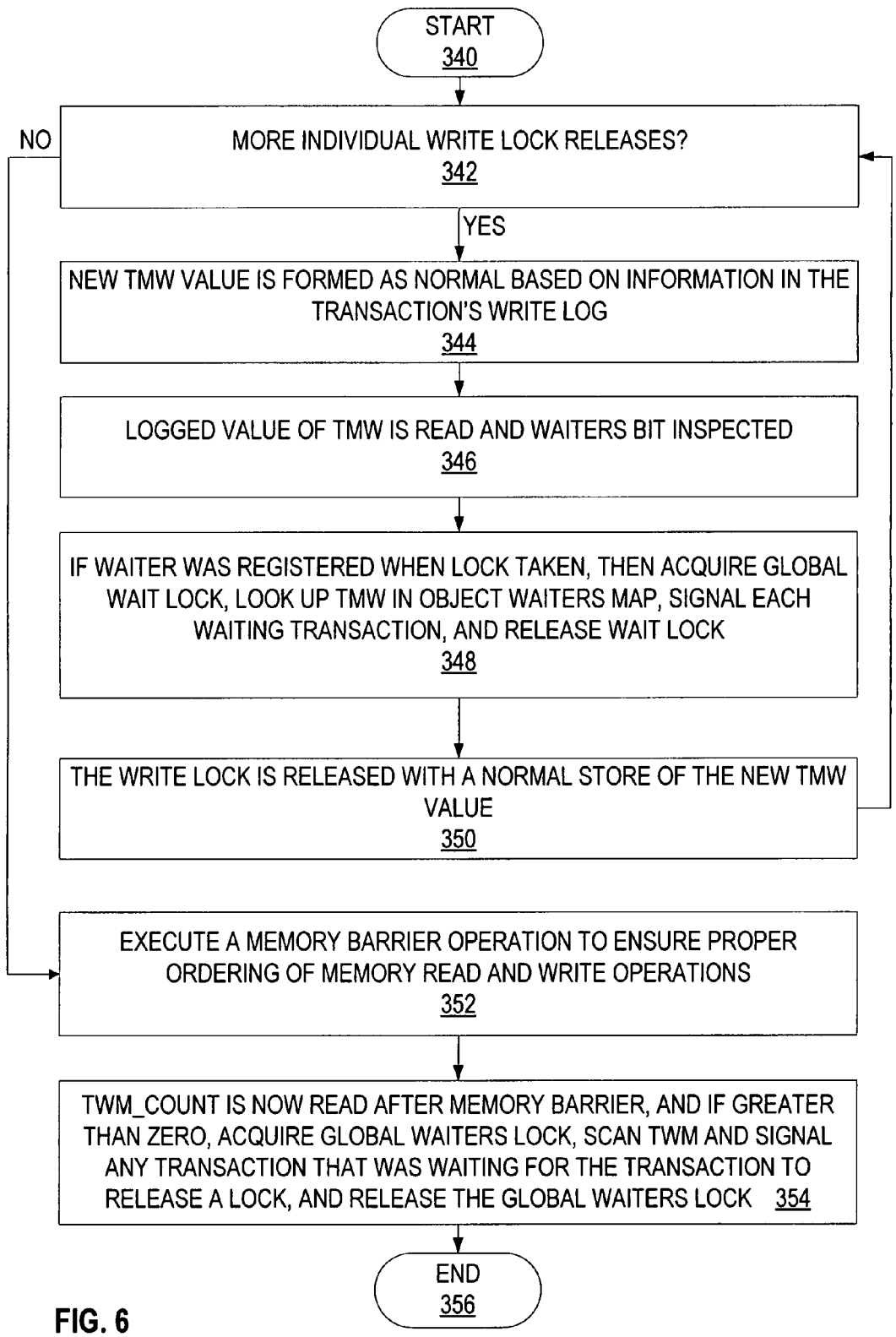
FIG. 6 is a process flow diagram for one implementation of the system of FIG. 1 illustrating the stages involved in performing a wait notification by any transaction releasing a write lock.

FIG. 6 illustrates one implementation of the stages involved in performing a wait notification by any transaction releasing a write lock. The process begins at start point 340 determining if there are more individual write locks to release (decision point 342). If so, then a new TMW value is formed as normal based on information in the transaction's write log (stage 344). The logged (or previous) value of the TMW is read and the waiters bit is inspected (stage 346). If there was a waiter registered when the lock was taken, then the global wait lock is acquired, the TMW is looked up in the object waiters map and each waiting transaction is signaled, and the global wait lock is released (stage 348). The write lock is released with a normal store operation of the new TMW value (e.g. no CAS is required) (stage 350).

Once all of the individual write lock releases have been handled and there are no more (decision point 342), then the system executes a memory barrier operation to ensure proper ordering of memory read and write operations (stage 352). If TWM_COUNT is now read after the memory barrier, and if it is greater than zero, a global waiters lock is acquired, the TWM is scanned and any retrying transaction that was waiting for the transaction to release a lock is signaled, and then the global waiters lock is released (stage 354). The process ends at end point 356.

In another implementation, instead of using a global TWM to register waits of one transaction on another, the system registers the waits directly with the transaction that currently owns the write lock on each entry in the wait set. In this implementation, the TWM_COUNT is not necessary, either.

Figure 7:
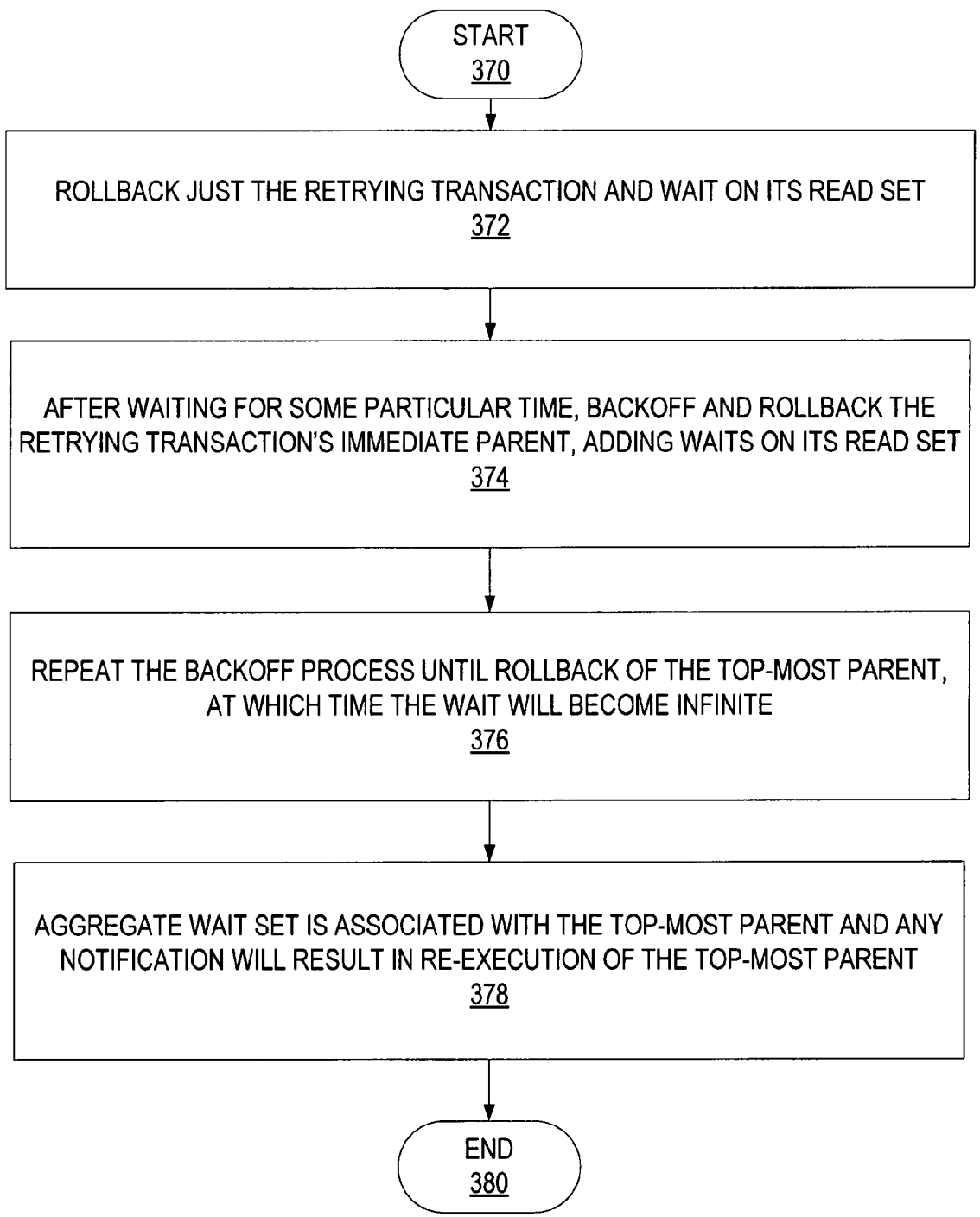
FIG. 7 is a process flow diagram for one implementation of the system of FIG. 1 that illustrates the stages involved in starting a rollback with just a retrying transaction and progressively expanding to ancestors of the retrying transaction to the top-most parent.

FIG. 7 illustrates one implementation of the stages involved in starting a rollback with just a retrying nested transaction and progressively expanding to ancestors of the retrying nested transaction to the top-most parent. The process begins at start point 370 with rolling back just the retrying transaction and waiting on its read set (stage 372). After waiting for some particular time or other criteria, the system backs off and rolls back the retrying transaction's immediate parent, adding waits on the parent's read set (stage 374). The amount of time to wait before backing off can be determined by a simple algorithm that waits a fixed amount of time, or using more complex algorithms that use information about contention in the system or other information to determine how long to wait, or when to shorten the wait based on new information. The backoff process is repeated until rollback of the top-most parent, at which time the wait will become infinite (stage 376). The aggregate wait set is associated with the top-most parent and any notification will result in re-execution of the top-most parent (stage 378). The process ends at end point 380.

Figure 8:
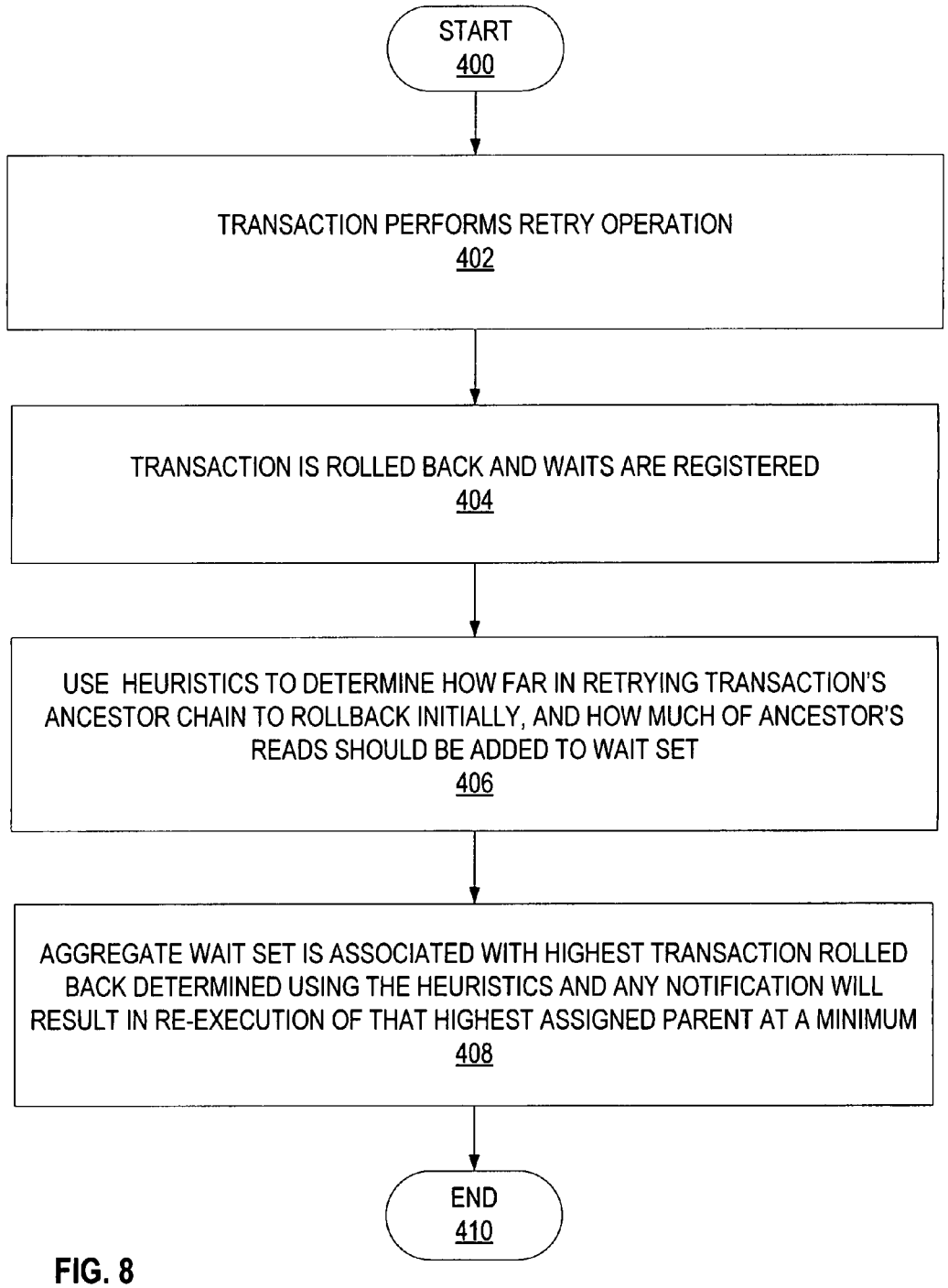
FIG. 8 is a process flow diagram for one implementation of the system of FIG. 1 that illustrates the stages involved in starting a retry operation using the read set of a particular transaction, then using heuristics to determine how far to expand up the chain.

FIG. 8 illustrates one implementation of the stages involved in starting a retry operation using the read set of a particular transaction and using heuristics to determine how far to initially expand the wait set or rollback up the chain. The process begins at start point 400 with a transaction performing a retry operation (stage 402). The transaction is rolled back and waits are registered as previously described (stage 404). Next, use heuristics (e.g., size of read set of ancestors, types of waits registered, data from previous executions of the transactions, etc.) to determine how far to roll back initially, and how much of the ancestors' reads should be added to the wait set (stage 406). The aggregate wait set is associated with the highest transaction rolled back determined using the heuristics and any notification will result in re-execution of that highest assigned parent at a minimum, or the highest ancestor added to the wait set but not yet rolled back whose read set has changed (stage 408). These heuristics and methods may be used again as waits expire and backoff processing occurs (as described in FIG. 7.) The process ends at end point 410.

Let's look at an example of how this could work. Suppose there is a chain of transactions, with Tx1 being the parent of Tx2, and Tx2 being the parent of Tx3. Tx3 executes a retry, and then needs to be rolled back and its read locations added to the wait set. One issue to consider is whether or not to also roll back Tx2 and add its read locations to the wait set now, since it might be appropriate. Another issue to consider is whether or not to just add Tx2's read set to the wait set, but not roll back Tx2, since it also might be appropriate, too. Having done that the latter, then if Tx3 is awoken due to a change in Tx3's read set, then Tx3 can just be re-executed. If, however, Tx3 is subsequently awoken due to a change in Tx2's read set, then now Tx2 must also be rolled back and re-executed from there.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage medium having computer-executable instructions for causing a computer to perform steps comprising:
    allowing a retrying transaction to execute a retry operation;
    registering for waits on every read in a read set of the retrying transaction;
    causing the retrying transaction to wait for notification that something in the read set has changed; and
    initiating a wait notification from a transaction that is releasing a write lock, the write lock being released with a normal store operation.

2. The computer storage medium of claim 1, further having computer-executable instructions for causing a computer to perform steps comprising:
    receiving the wait notification from the signaling transaction, and then proceeding with waking up the retrying transaction, undoing all wait registrations, and re-executing the retrying transaction.

3. The computer storage medium of claim 1, wherein upon rolling back the retrying transaction, all normal rollback processing is performed.

4. The computer storage medium of claim 1, wherein upon rolling back the retrying transaction, if the transaction is also determined to already be inconsistent, then retrying the transaction immediately.

5. The computer storage medium of claim 1, wherein the registering for waits step comprises the steps of:
    for each optimistic read in the read set of the retrying transaction, if a transactional memory word is currently locked by another transaction, then adding an entry in a global transaction waiters map indicating the retrying transaction is waiting for a locking transaction to release the write lock.

6. The computer storage medium of claim 1, wherein the registering for waits step comprises the steps of:
    for each optimistic read in the read set of the retrying transaction:
        ensuring a transactional memory word is not currently locked by another transaction;
        if the optimistic read is invalid, then finishing rollback as normal and stopping the registering for waits; and
        if the optimistic read is valid, setting a waiters bit using an atomic series of one or more writes.

7. The computer storage medium of claim 6, wherein the registering for waits step further comprises the steps of:
    if the atomic series of one or more writes was successful, then adding an entry to a global object waiters map to indicate the retrying transaction is waiting for any change to the read set.

8. The computer storage medium of claim 7, wherein the registering for waits step further comprises the steps of:
    if the atomic series of one or more writes was not successful, and failed because another transaction had written a different version number into the transactional memory word, then finish rollback processing as normal without registering any more waits.

9. The computer storage medium of claim 8, wherein the registering for waits step further comprises the steps of:
    if the atomic series of one or more writes was not successful, and failed because another transaction had written a write-lock value into the transactional memory word, then adding an entry in a global transaction waiters map indicating the retrying transaction is waiting for a locking transaction to release the write lock.

10. A method for performing a wait notification for a retrying transaction comprising the steps of:
    forming a new value for a transactional memory word based on an original value of the transactional memory word in a write log of a transaction;
    if the original value of the transactional memory word from the write log contains a waiters bit, looking up the transactional memory word in an object waiters map, signaling each waiting transaction, and then releasing the write lock.

11. The method of claim 10, wherein the write lock is released with a normal store of the new transactional memory word value.

12. The method of claim 10, wherein the stages are repeated for each individual write lock release.

13. The method of claim 12, after all write locks are released, executing a memory barrier operation to ensure proper ordering of memory read and write operations.

14. The method of claim 13, wherein if a count of transaction waiters is read after the memory barrier operation and the count is greater than zero, then acquiring a global waiters lock, looking in the transaction waiters map and signaling any other transaction that is waiting for the transaction to release a held lock, and then releasing the global waiters lock.

15. A method for starting a rollback with just a retrying transaction and progressively expanding to ancestors of the retrying transaction comprising the steps of:

rolling back just a retrying transaction and performing a first wait on a first read set of the retrying transaction;

after waiting for some particular time, performing a backoff process to backoff and roll back an immediate parent of the retrying transaction, adding a second wait on a second read set of the parent transaction; and repeating the backoff process until rollback of a top-most parent, adding an additional wait for each next parent.

16. The method of claim 15, wherein an aggregate of the first wait, second wait, and any additional waits are associated with the top-most parent.

17. The method of claim 16, wherein any notification will result in re-execution of the top-most parent.

18. The method of claim 15, wherein heuristics are used as part of the backoff process.

\* \* \* \* \*